Figure 1:
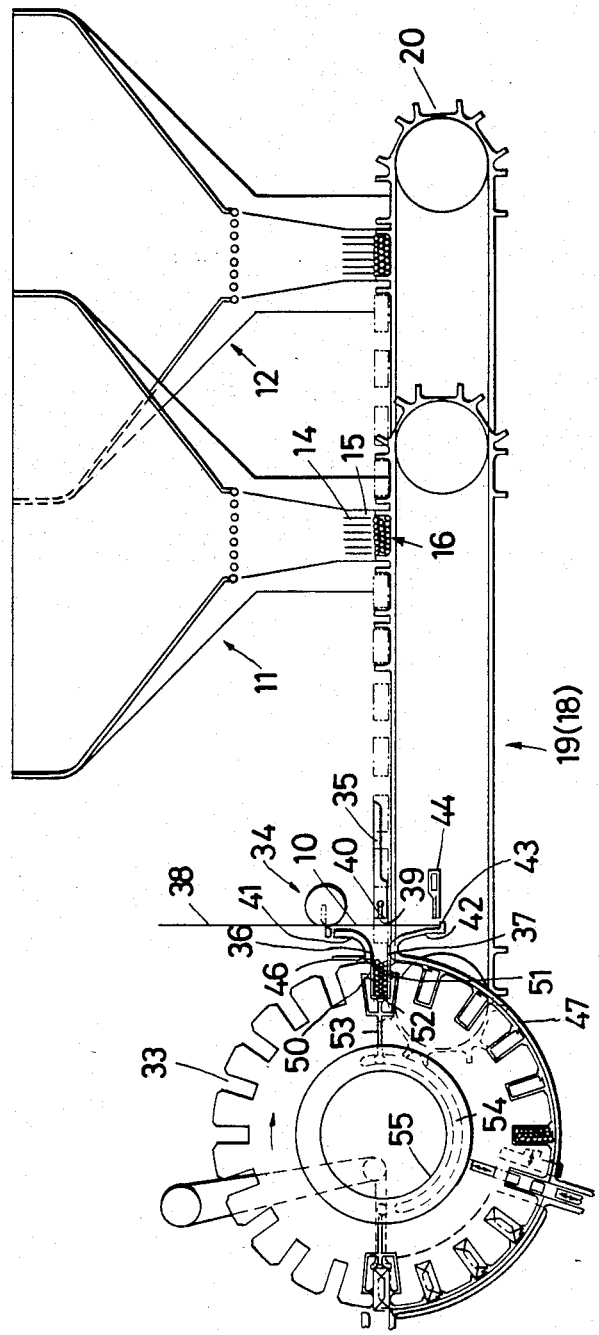

United States Patent [19]

Focke et al.

[11] Patent Number: 4,507,903
[45] Date of Patent: * Apr. 2, 1985

[54] PACKING CIGARETTES

[75] Inventors: Heinz Focke; Kurt Liedtke, both of Verden, Fed. Rep. of Germany

[73] Assignee: Focke & Pfuhl, Fed. Rep. of Germany

[*] Notice: The portion of the term of this patent subsequent to Mar. 21, 1995 has been disclaimed.

[21] Appl. No.: 863,559

[22] Filed: Dec. 22, 1977

Related U.S. Application Data

[63] Continuation of Ser. No. 585,413, Jun. 9, 1975, Pat. No. 4,079,575.

[30] Foreign Application Priority Data

Jun. 11, 1974 [DE] Fed. Rep. of Germany ....... 2428168

[51] Int. Cl.$^3$ ............................................. B65B 19/10
[52] U.S. Cl. ...................................... 53/151; 53/149; 53/152; 53/236
[58] Field of Search ................. 53/148, 149, 151, 152, 53/154, 234, 236; 198/445, 447, 448

[56] References Cited

U.S. PATENT DOCUMENTS

| 1,539,745 | 5/1925 | Kerlin et al. | 53/149 |
| 1,769,650 | 7/1930 | Rose | 53/151 |
| 1,888,831 | 11/1932 | Neef | 53/151 |
| 1,961,047 | 5/1934 | Horgan | 53/149 |
| 1,986,215 | 1/1935 | Orstrom | 53/149 X |
| 2,551,199 | 5/1951 | Basus | 53/150 |
| 3,224,267 | 4/1966 | Berta | 198/448 |
| 3,301,375 | 1/1967 | Sumermund | 221/68 X |
| 3,412,843 | 11/1968 | Maulini | 198/419 |
| 3,520,394 | 7/1970 | Seragnoli | 53/151 X |
| 3,802,154 | 4/1974 | Dillon | 53/154 |
| 4,079,575 | 3/1978 | Focke et al. | 53/148 X |
| 4,096,682 | 6/1978 | Sheahan | 53/151 X |

FOREIGN PATENT DOCUMENTS

| 445555 | 6/1927 | Fed. Rep. of Germany | 53/150 |
| 583696 | 12/1946 | United Kingdom | 53/151 |
| 881068 | 11/1961 | United Kingdom | 53/151 |
| 1352524 | 5/1974 | United Kingdom | 53/148 |

Primary Examiner—John Sipos
Attorney, Agent, or Firm—Sughrue, Mion, Zinn, Macpeak, and Seas

[57] ABSTRACT

There is provided a method of and apparatus for packing rod-shaped articles, especially cigarettes. A rotatable turret is used, into which blanks are introduced into pockets of the turret, with partial folding of the blanks, whereafter groups of articles are axially introduced into the blanks in pockets, the article groups being introduced alternately from opposite sides of the turret. There is also provided an apparatus whereby article groups can be ejected alternately on both sides of a magazine and also an apparatus wherein, to form article groups from three article rows or layers, the middle row containing fewer cigarettes than the top and bottom rows, a lateral chute wall of the magazine terminates above the region of the cigarette groups to be ejected, merely articles of the top and bottom rows being ejectable in this region via a recess in the entraining member associated with the lateral chute, such recess being at the height of the middle cigarette row.

6 Claims, 9 Drawing Figures

PACKING CIGARETTES

This is a continuation, Ser. No. 585,413 filed June 9, 1975 now U.S. Pat. No. 4,079,575.

This invention relates to a method of and an apparatus for packing a group of rod-like articles, more particularly cigarettes, through the agency of pockets which are disposed preferably at the periphery of a rotating turret, the pockets receiving at least one blank and the cigarette group it is required to wrap.

It is an object of the invention to provide a method of and an apparatus for producing packets for cigarettes or the like with relatively little mechanical outlay and at high efficiency and with careful treatment of the cigaretts or the like. Hereafter, the word "cigarette" is used generally to refer to cigarettes and other rod-shaped articles.

According to the first aspect of the present invention there is provided a method of packing a group of rod-like articles, wherein the group of rod-shaped articles are packed through the agency of pockets which are disposed preferably at the periphery of a rotating turret and into which a blank is introduced, with partial folding, more particularly in a U-shape, whereafter the groups of articles are introduced axially into the blank in the pocket, the article groups being introduced axially into the pockets—that is the blank—alternately from opposite sides of the turret.

According to the second aspect of the present invention there is provided an apparatus for wrapping groups of rod-like articles in at least one blank, which apparatus comprises a rotatable turret having along its periphery a number of pockets which are open in the radially outwards direction, the apparatus having a feeder for the consecutive introduction of blanks into the turret pockets with radial movement of the pockets and for folding around the pusher, the blank being introducible into the pocket near a mouthpiece facilitating an edge-free folding of the blank.

Thus, the blank for producing the pack is first introduced, with partial folding, more particularly in a U-shape, into the outwardly open turret pocket, whereafter the cigarette group is introduced into the U-shaped blank in the pocket.

According to the invention, therefore, a blank for producing the pack is first given preliminary shaping in an at least radially outwardly open pocket of a rotatable turret until the blank is disposed in the pocket in a U-shape, the open long side being directed radially outwards. Preferably, the pack end faces are open. The group of cigarettes is then introduced into the U-shaped blank in the turret pocket. The group of cigarettes can be introduced alternately either radially of the turret or axially—that is from the sides.

Very advantageously, more particularly if high performances are required, the cigarette groups are introduced into the pockets axially—that is from the side of the turret. According to a feature of the invention, a conveyor for the discrete prepared cigarette groups is provided on both sides of the turret. The cigatette groups are introduced from the conveyors, more particularly pocket chains, alternately from either side of the turret into the pockets axially.

The cigarette groups are supplied to the turret by two conveyors, more particularly pocket chains, terminating one on each side of the turret. The conveyors are charged by a common cigarette magazine disposed between the two pocket chains. Through the agency of a specially devised reciprocating pusher or slider, the cigarette groups can be ejected in both directions of movement and, therefore, to the pocket chains disposed on both sides of the magazine.

Figure 2:
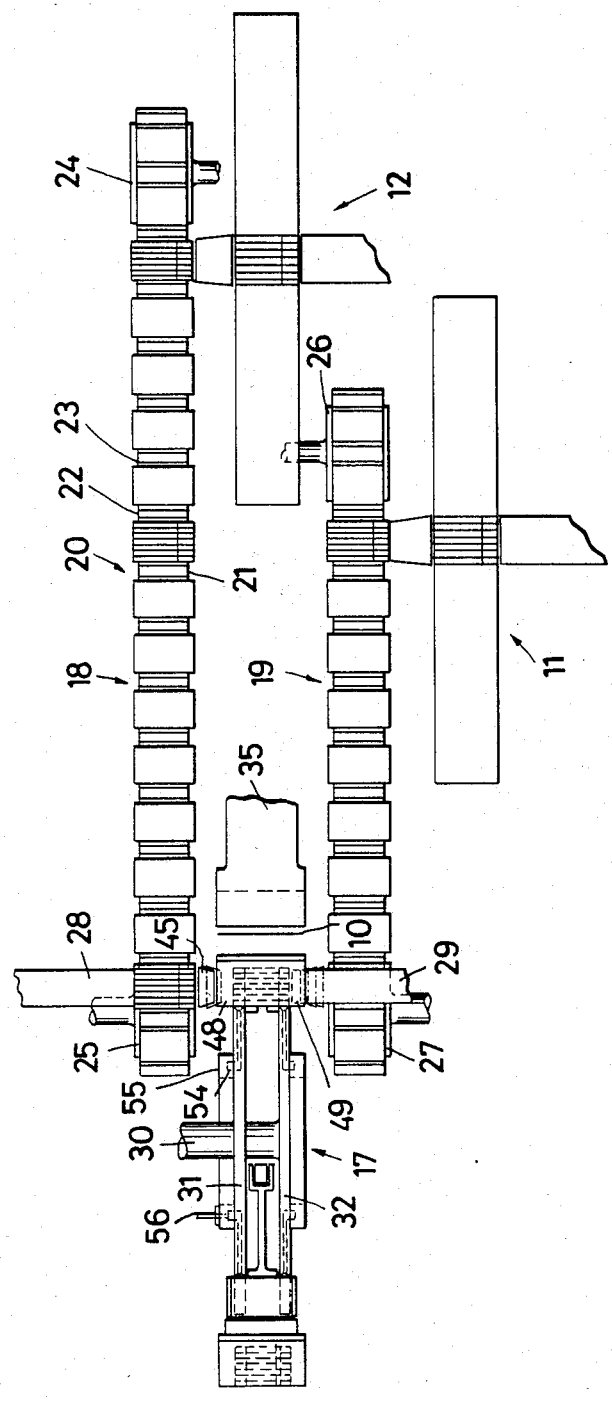
Figure 3:
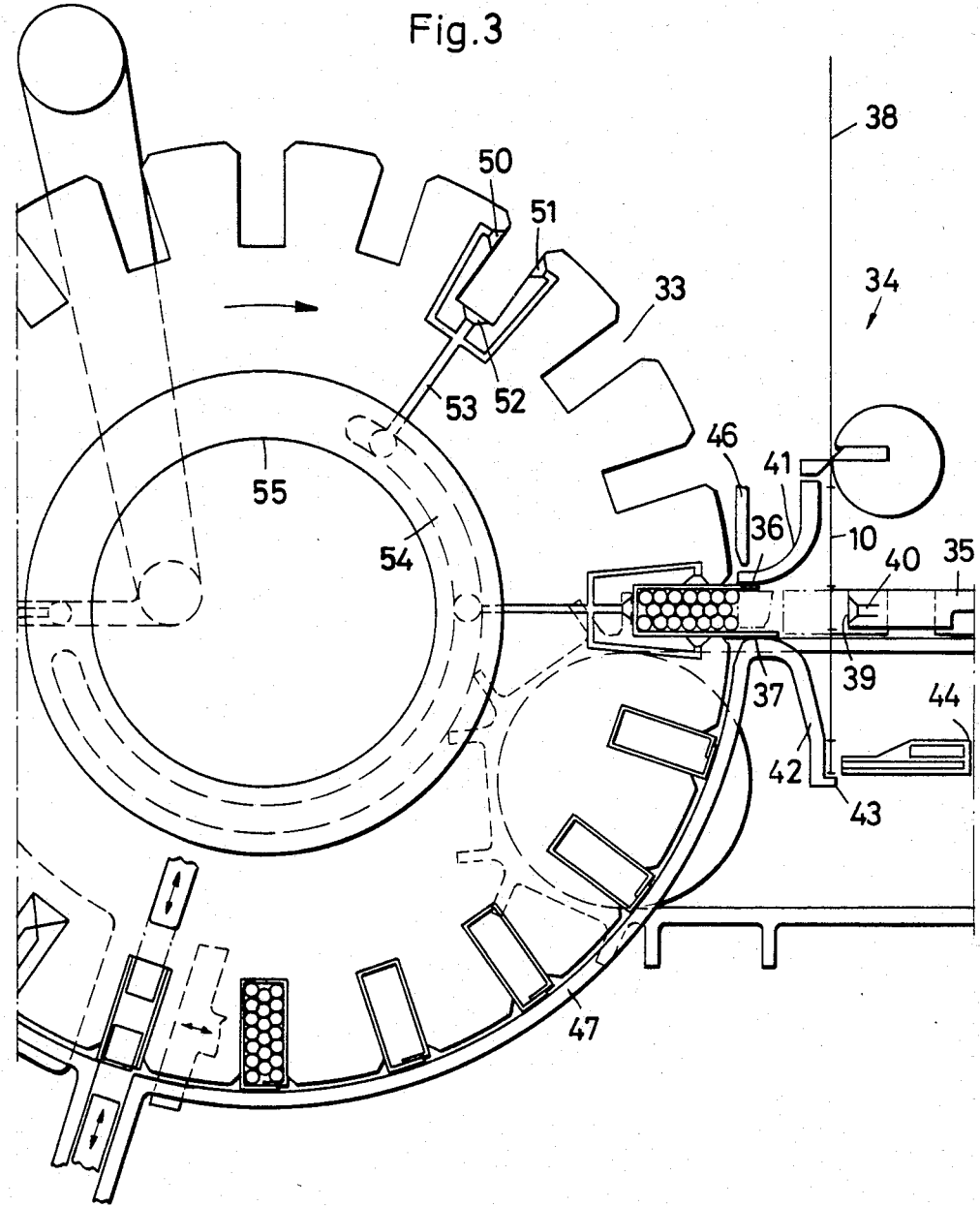
Figure 4:
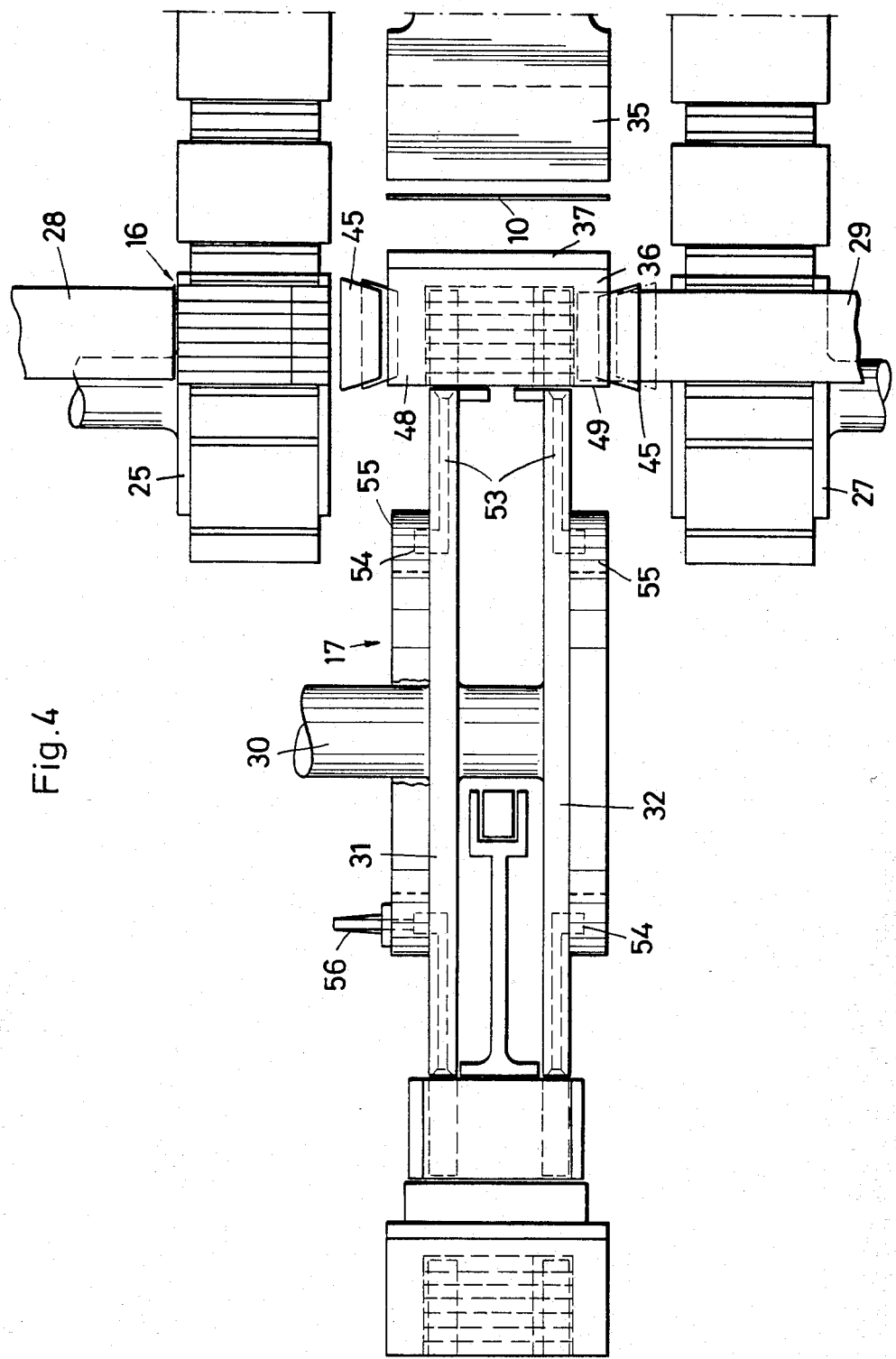
Figure 5:
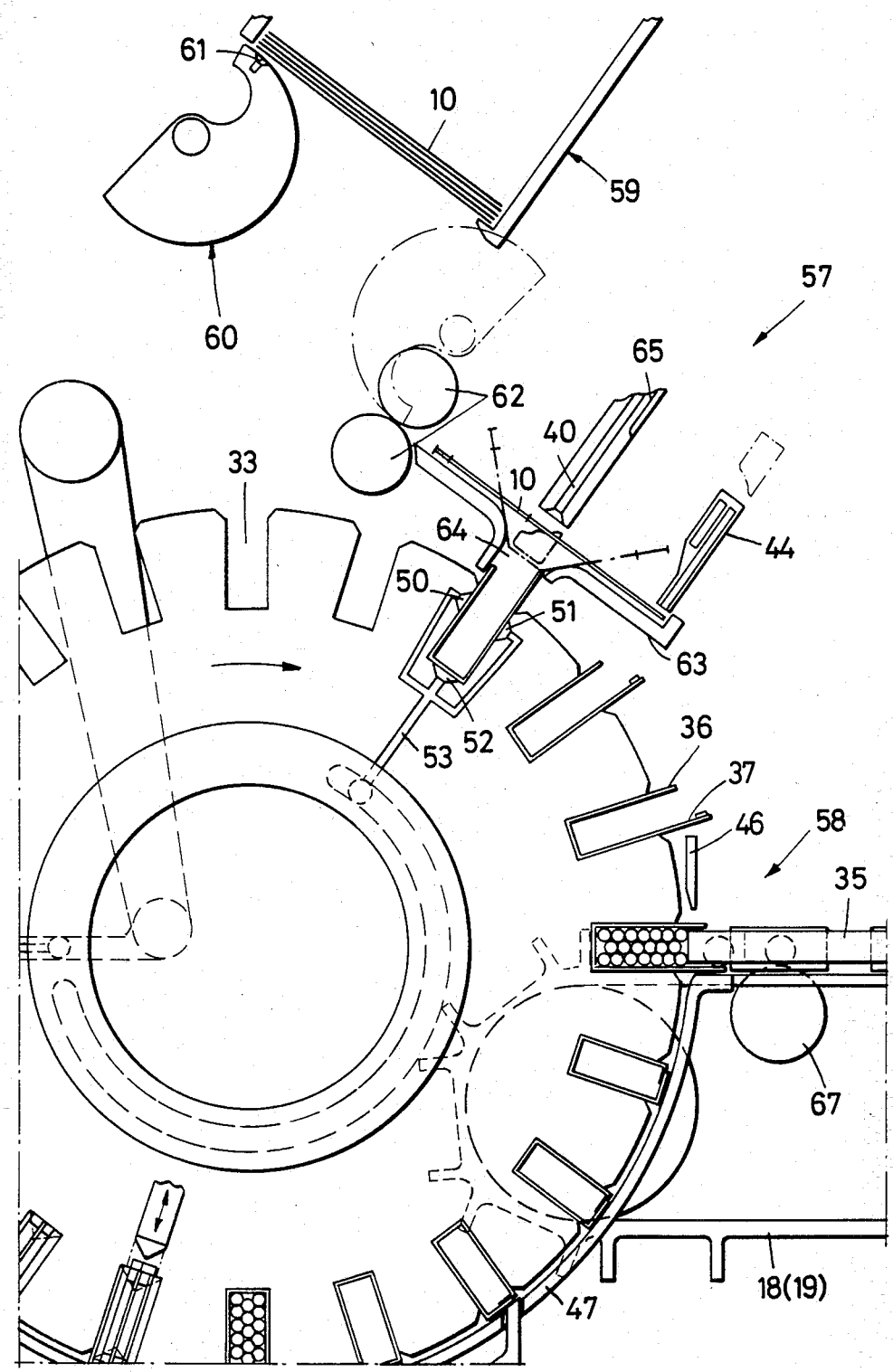
Figure 6:
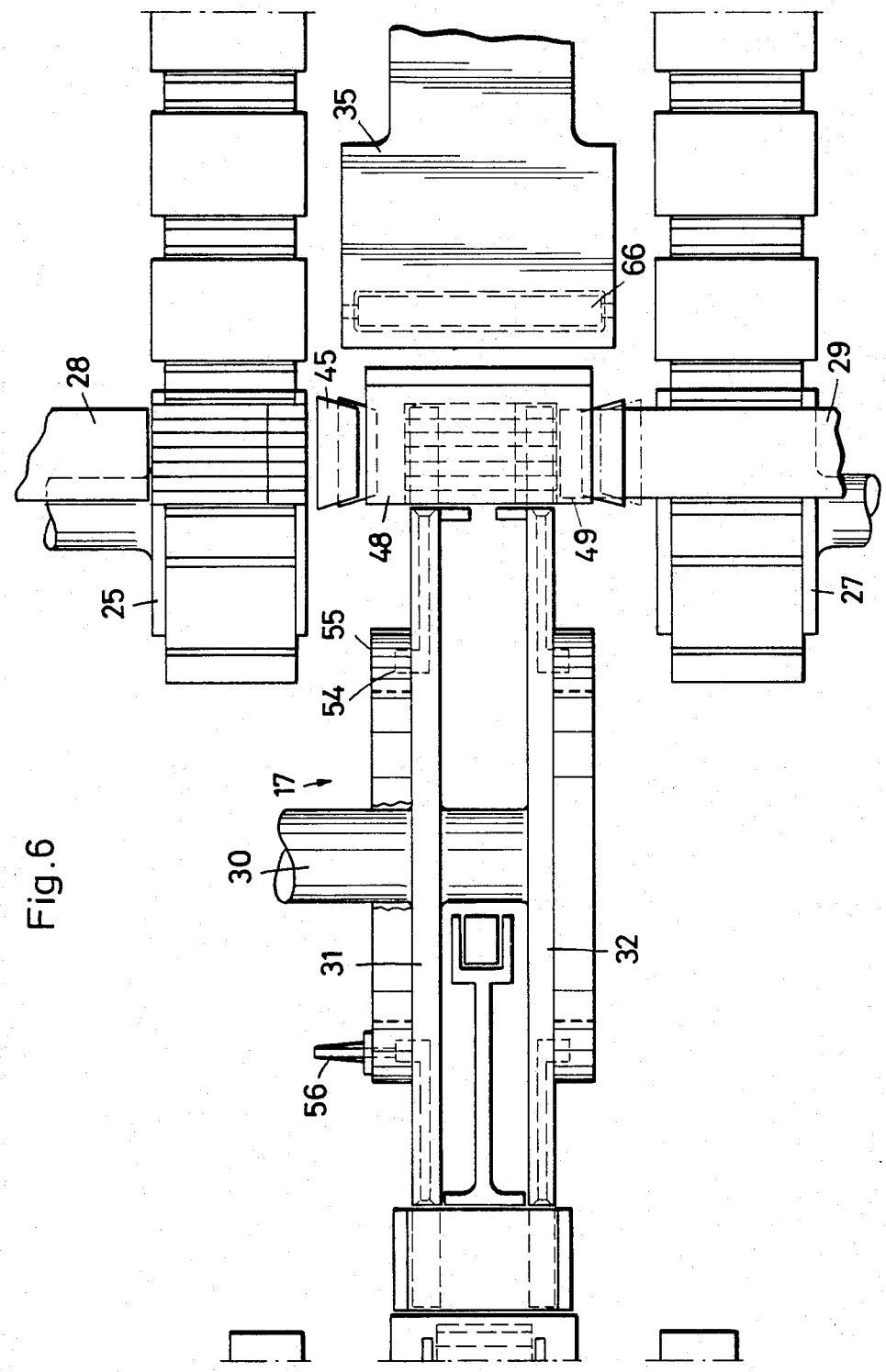
Figure 7:
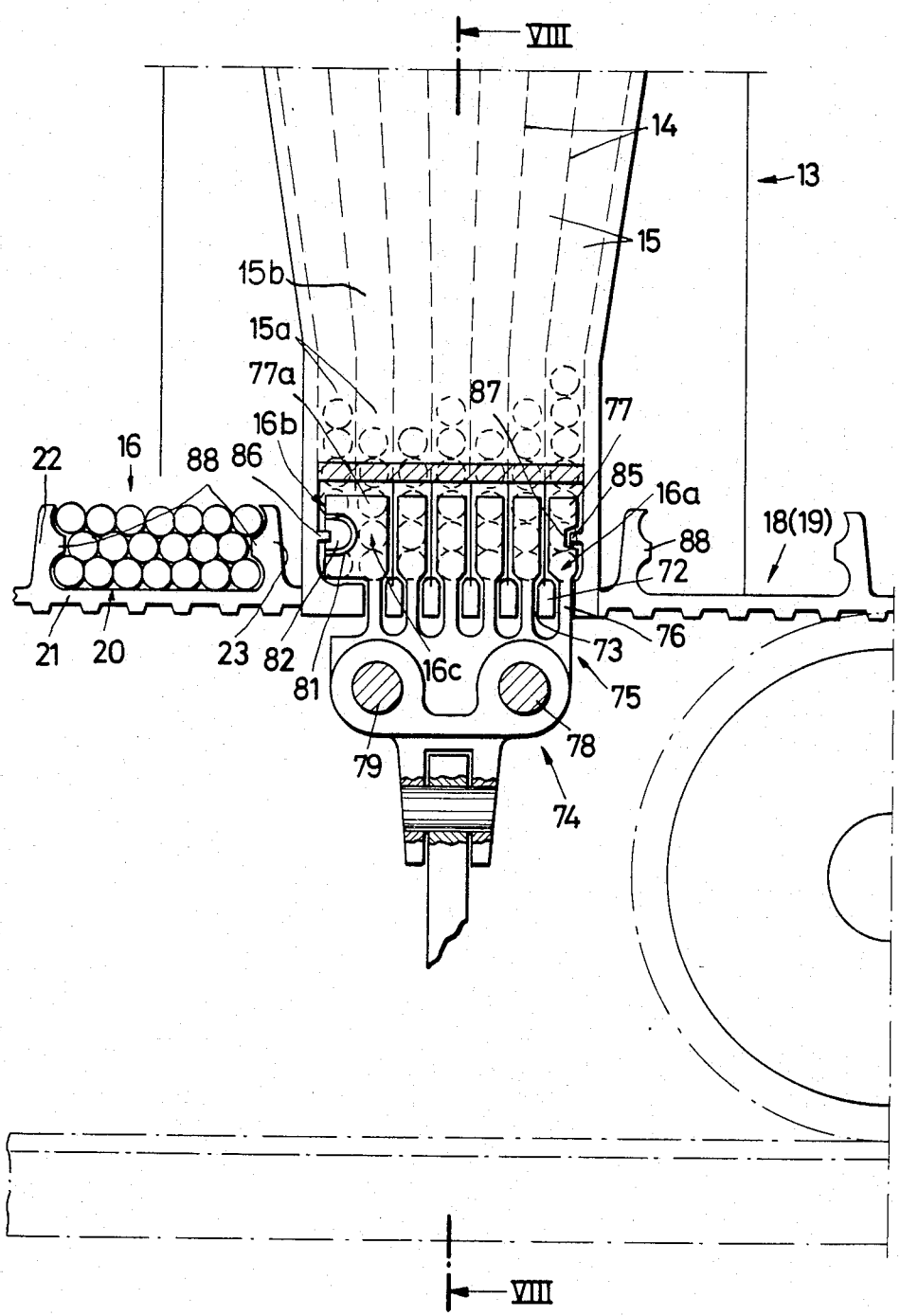
Figure 8:
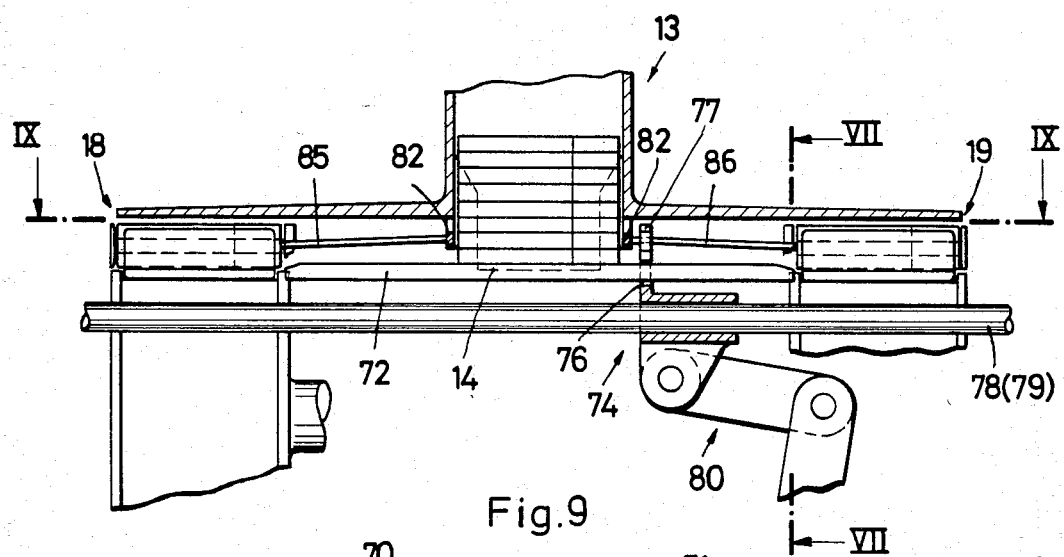
Figure 9:
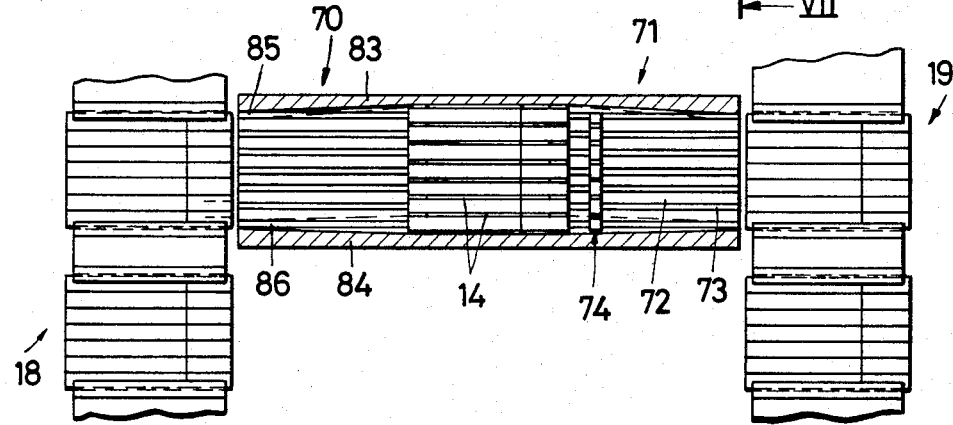

For a better understanding of the present invention and to show how the same may be carried into effect, reference will now be made, by way of example, to the accompanying drawings, in which:

FIG. 1 shows a diagrammatic side elevational view of a part of an apparatus in accordance with the invention for wrapping cigarette groups in a blank, FIG. 2 shows a plan view of the apparatus of FIG. 1, FIG. 3 shows a side elevational view, to an enlarged scale, of part of a turret of the apparatus of FIG. 1, FIG. 4 shows a plan view of the apparatus of FIG. 3, FIG. 5 shows a view similar to FIG. 3 of another embodiment of apparatus in accordance with the invention, FIG. 6 shows a plan view of the apparatus of FIG. 5, FIG. 7 shows a side elevational view of a magazine according to the invention and a pocket chain, FIG. 8 shows a cross-sectional view through the magazine of FIG. 7, and FIG. 9 shows a horizontal sectional view on the line IX—IX of FIG. 8.

Cigarettes for packing in a pack to be contrived from a blank 10 are taken from cigarette magazines 11 and 12 or 13. The magazines 11 and 12 of the embodiment shown in FIGS. 1 and 2 are conventional. In the bottom zone, magazine chutes 15 are bounded by chute walls 14, and a row of cigarettes disposed one above another is received in each chute 15. At the bottom, cigarette groups 16 are ejected from the magazine consecutively by an appropriate pusher or slider (not shown in FIGS. 1 and 2) to a conveyor.

A turret 17, moving in timed rotation, is supplied by two conveyors with cigarette groups 16. The conveyors are endless pocket chains 18 and 19 comprising a number of spaced-apart compartments 20 which are in cross-section substantially U-shaped and which can each receive one cigarette group 16. The chains 18 and 19 comprise preferably commercially available toothed belts 21 made of a resilient material (see more particularly FIG. 7). The outside of the belts 21 forms the base of the compartments 20. The lateral boundaries take the form of side walls 22 and 23 are unitary with the belts 21. The compartments 20 are open on the sides near the ends of the cigarettes. The chains 18 and 19 run around sprockets 24 and 25, 26 and 27, one sprocket of each pair being driven.

For turret feeding, a cigarette group 16 is supplied to the turret 17 by sliders 28 and 29 alternately from the compartments 20 of each chain 18 and 19.

The turret 17 comprises two spaced-apart discs 31 and 32 disposed on a common shaft 30. The pockets 33 are formed by radially directed recesses which are disposed at the outer periphery, which are in alignment with one another, which are in cross-section substantially rectangular and which are open on the outside and on the sides.

In the embodiment shown in FIGS. 1 to 4, the open pockets 33 are first charged with the blank 10. The same is introduced radially into the pocket 33 by a pusher or feeder 35 at a common blank and charging station 34. The blank 10 then engages in a U-shape with the pocket inner walls, with lateral flaps or portions 36 and 37 of the blank 10 being the only parts thereof to project from the pocket 33.

The blank 10 is parted off from a continuous strip or web or the like 38 and is kept ready for use at the height of the pocket to be charged—that is at station 34—before being introduced substantially tangentially to the turret 17. During entrainment, the blank 10 is secured to end face 39 of pusher 35 by a suction bore 40 which is connected to a source of negative pressure.

At entry into pocket 33 the blank 10 goes through an orifice bounded by two substantially arcuate mouthpieces 41 and 42. The bottom mouthpiece 42 has a support edge 43 on which the bottom edge of the blank 10 bears. A reciprocating glue applicator 44 applies a strip of glue to the inside bottom edge of the blank 10.

Pushers 28 and 29 push the groups 16 through a displaceable mouthpiece guide 45 and into the U-shaped blank 10 and, therefore, into the pocket 33. The mouthpiece member 45, which advances to near the blank 10 during this introductory movement, prevents the ends of the cigarettes from knocking against the edges of the blank 10. During this phase the member 35 acts as the closure of the turret pocket 33 on the radially outward side.

After the group 16 has been introduced into pocket 33, a folder 46 folds the top side flap 36 on to the still exposed side of the group 16. As turret 17 rotates, the bottom side flap 37 is folded over by entering an outer stationary guide 47 which extends around some of the turret, so that the side flaps 36 and 37 overlap at their edges and are joined together by means of glue previously applied to the bottom side flap 37. The folder 46 is represented in simplified schematic form. In actual utilization, this folding element can be mounted on a suitable holder which is moved out of the path of the blank flap 37. It is then placed into position to perform the following operation and, thereafter, in a synchronized manner, moves away from the path of the blank. As the turret continues to rotate, the laterally projecting end flaps 48 and 49 of the blank are folded by folding tools which will not be described in detail herein since they are well known in the art.

To ensure adequate retention of the blanks 10 in the pockets 33, the three pocket inner walls are each formed with at least one suction orifice 50, 51 and 52, the suction orifices communicating by way of a common suction passage 53 with a ring main 54 of a stationary ring 55. The main 54 extends over some of the turret periphery and communicates via suction line 56 with an appropriate source of negative pressure. Each of discs 31 and 32 has a suction system of this kind near the pockets 33.

In the embodiment shown in FIGS. 5 and 6, a blank station 57 and a filling station 58 are disposed in spaced relationship to one another along the periphery of turret 17.

In this embodiment, the blank station 57 operates with prepared discrete blanks 10 taken from a blank magazine 59. The blanks are removed from the magazine by means of a roller device 60 which engages with the edge of a blank 10 by means of a suction orifice 61 and rotates to supply the blank 10 to a roller pair 62, the same conveying the blank 10 to a platform 63 disposed substantially tangentially to turret 17.

The platform 63, has opposite a nearby pocket 33, a mouthpiece 64 through which a pusher 65 introduces the blank 10 into the pocket 33. The device 65 is of identical construction to the device 35 shown in FIGS. 1 to 4 and described herein.

The cigarette group 16 is introduced into the U-folded blank 10 in the pockets 33 at the filling station 58, in just the same way as in FIGS. 1 to 4. The pusher 35 has a glue applicator roller 66 which runs over the edge of the blank bottom side flap 37 and applies a strip of glue. When the device 35 is in its withdrawn position, the glue is taken up by a glue roller 67.

As shown in FIGS. 7 to 9, the two pocket chains 18 and 19 are fed from a common cigarette magazine 13 so disposed between the two chains 18 and 19 that the groups 16 ejected from magazine 13 are introduced directly into the compartments 20 of the top run of the chains 18 and 19. Groups 16 are fed alternately in both directions from the bottom region of the magazine chutes 15 through a respective guide member 70 and 71 into the compartments 20 of the chains 18 and 19, respectively.

The bottom ends of the chute walls 14 which bound the various chutes 15 are rigidly secured in support bars 72. The bars 72 are spaced apart from one another to leave apertures 73 and extend over the width of magazine 13 and over the region of the guide members 70 and 71 to very near the chains 18 and 19. The cigarettes of the bottom row 16a of a group 16 are disposed on the bars 72 near the apertures 73.

The resulting apertured "base" of the magazine 13 and of the guide members 70 and 71 makes it possible to use a double-acting pusher 74 which can move over the whole length of the bars 72. The function of the pusher 74 is to eject groups 16 alternately to either hand from the magazine 13 and to supply them via the guide members 70 and 71 to the corresponding compartment 20 of one or the other chain 18 or 19. The pusher 74 comprises various fingers 75 which have a relatively narrow neck extending through the apertures 73. Above the bars 72, the fingers 75 widen into entraining members 77 which, as they pass through the bottom region of the magazine 13, engage with and entrain a group of cigarettes disposed one above another—in the present example three cigarette rows 16a, 16b and 16c which are disposed one above another. The pusher 74 is slidingly mounted on continuous guide rods 78 and 79 and can be reciprocated, for example by a crank drive 80.

Movement of the pusher 74, for example from right to left (in relation to FIGS. 8 and 9) ejects a group 16 from the magazine and introduces such group via the guide members 70 into a compartment or pocket 20 of the chain 19. Movement of the pusher 74 in the opposite direction causes another group 16 to be ejected and supplied this time to the chain 18.

In the case of groups 16 containing 20 cigarettes, the bottom row 16a and the top row 16b each contains 7 cigarettes and the middle row 16c contains six cigarettes. The six cigarettes of the middle row 16c are disposed in staggered relationship to the other two rows 16a and 16b.

So that 20 cigarettes at a time may be ejected, an outer entraining member 77a is of a size and design such as to be associated with two adjacent magazine chutes 15a and 15b. Near the cigarette rows to be ejected the chutes 15a and 15b are open towards one another instead of being separated from one another by a chute wall. The widened entraining member 77a is formed half-way up its height with a lateral recess 81 which is adapted substantially to the shape and size of a single cigarette. Recess 81 is disposed near a projection 82 which is of substantially the same shape as recess 81 and which is fixedly mounted on the magazine. As can be gathered from FIG. 8, one such projection 82 is provided on the two exit and entry sides.

An outer cigarette of the middle row 16c is disposed near the projection 82 and therefore near the recess 81. When the pusher—that is the entraining device 77 and 77a—passes through the magazine 13, the cigarette near the projection 82 is not removed but remains in the magazine, and so the issuing group of cigarettes contains only six cigarettes in the middle row 16c.

Side walls 83 and 84 of the guide 70 and 71 continue from the magazine and coverage towards the chains 18 and 19, so that the cigarettes of the discrete rows 16a, 16b and 16c are closed up together to eliminate the gap caused by the chute walls.

The side walls 83 and 84 have guide ribs 85 and 86 at the height of the middle row 16c, the guide ribs bringing the cigarettes of the middle row 16c into close engagement with one another. The guide ribs also cause a relative movement of the complete middle row 16c so that the cigarettes therein comes into a staggered position relatively to the cigarettes of the two outer rows 16a and 16b. To move the middle row 16c into the middle position, it is moved as a whole towards the side of the projection 82 by the guide rib 85, the same converging considerably towards the centre of the guide member 70 or 71. The opposite guide rib 86 has a corresponding slightly divergent shape.

The outer entraining member 77 of the pusher 74, such member being disposed opposite the entraining member 77a is formed with a recess at the height of the guide rib 85. The opposite guide rib 76 is disposed near the recess 81 which is present anyway.

The side walls 22 and 23 of the pockets 20 in the chains 18 and 19 are so shaped internally that the outer cigarettes of the top and bottom rows 16a and 16b are received in rounded troughs, while a projection 88 is provided near the central row 16c, thus ensuring positive retention of the group 16 in the pockets 20.

We claim:

1. Apparatus for packaging cigarettes which are ejected in groups from a magazine, comprising:
   (a) a magazine having a plurality of magazines chutes in lower portions thereof, each chute receiving a vertical row of cigarettes;
   (b) reinforcement support rods at the lower end of walls of said chutes which abut the respective bottom cigarettes within each magazine chute;
   (c) slit-like openings formed between the support rods the width of which is smaller than the diameter of one cigarette;
   (d) a common, reciprocating slide having a number of fingers corresponding to the number of magazine chutes to be emptied which enter the magazine chutes and engages a plurality of layers of cigarettes stacked one above the other so as to eject cigarette groups corresponding to one package from the magazine alternatively to either one or the other side;
   (e) each finger having a portion which passes through the slit-like openings;
   (f) first and second conveyor means arranged one on opposite sides of said magazine, said conveyor means having compartments of a size for receiving assembled cigarette groups corresponding to one package ejected from said magazine; and
   (g) first and second guide elements for the cigarette groups having sidewalls for holding the cigarette groups arranged on opposite sides of the magazine for guiding the assembled cigarette groups to the compartments of the conveyors, the guide element laterally gathering together the cigarettes of each group to close the gap between horizontally adjacent cigarettes.

2. Apparatus according to claim 1, further comprising two guide rods upon which the slide is mounted and drive means coupled to the slide.

3. Apparatus according to claim 1, wherein a lateral chute wall of the magazine ends above the area of the cigarette group to be ejected so as to form cigarette groups of three rows of cigarettes including a center cigarette row having a smaller number of cigarettes than the upper and lower rows of cigarettes.

4. Apparatus according to claim 3, further comprising a projection having dimensions of approximately one cigarette arranged laterally in the area of the center row of cigarettes, the finger surrounding the two lateral chutes not separated from each other by a chute wall being provided with an opening surrounding the projection in such a manner that cigarettes lying in the area of the projection are not ejected.

5. Apparatus according to claim 3, wherein the guide elements are provided with guide ribs converging in the direction of conveyance of the cigarettes of the center cigarette row arranged on sidewalls of the guide element, whereby the guide ribs are arranged and formed in such a manner that the cigarettes of the center cigarette row are slidable relative to the cigarettes of the upper and lower cigarette rows in a lateral direction into a position with a predetermined displacement to the cigarettes of the upper and lower cigarette rows.

6. Apparatus according to claim 3, wherein the compartments of the conveyor are provided at the height of the center cigarette row of the cigarette group with rib-like projections.

* * * * *